United States Patent
Wang

(10) Patent No.: US 9,495,755 B2
(45) Date of Patent: Nov. 15, 2016

(54) APPARATUS, A METHOD AND A COMPUTER PROGRAM FOR IMAGE PROCESSING

(71) Applicant: Nokia Technologies Oy, Espoo (FI)

(72) Inventor: Tinghuai Wang, Tampere (FI)

(73) Assignee: Nokia Technologies Oy, Espoo (FI)

( * ) Notice: Subject to any disclaimer, the term of this patent is extended or adjusted under 35 U.S.C. 154(b) by 98 days.

(21) Appl. No.: 14/514,861

(22) Filed: Oct. 15, 2014

(65) Prior Publication Data

US 2015/0110392 A1    Apr. 23, 2015

(30) Foreign Application Priority Data

Oct. 22, 2013   (FI) ...................................... 20136040

(51) Int. Cl.
*G06K 9/00* (2006.01)
*G06T 7/00* (2006.01)

(52) U.S. Cl.
CPC ........... *G06T 7/0081* (2013.01); *G06T 7/0087* (2013.01); *G06T 7/0089* (2013.01); *G06T 2207/10024* (2013.01); *G06T 2207/20092* (2013.01); *G06T 2207/20101* (2013.01); *G06T 2207/20144* (2013.01); *G06T 2207/20156* (2013.01); *G06T 2207/20161* (2013.01)

(58) Field of Classification Search
CPC ..................... G06K 9/00362; G06K 9/00369; G06K 9/342; G06K 9/48; G06K 9/6221; G06K 9/6215; G06T 5/002; G06T 7/0046; G06T 7/0048; G06T 7/0081; G06T 7/0083; G06T 7/0087; G06T 7/0089; G06T 7/0091; G06T 2207/10016; G06T 2207/10024; G06T 2207/20106; G06T 2207/20101; G06T 2207/20144; G06T 2207/20161; G06T 2207/20168; G06T 2207/30196; G06Q 30/0601

See application file for complete search history.

(56) References Cited

U.S. PATENT DOCUMENTS

| 7,177,471 B2 | 2/2007 | Paraglos et al. |
| 7,277,582 B2 * | 10/2007 | Paragios ............... G06T 7/0081 382/173 |
| 7,391,882 B2 | 6/2008 | Paragyios |

(Continued)

FOREIGN PATENT DOCUMENTS

| WO | 03/065294 A1 | 8/2003 |
| WO | 2004/053793 A1 | 6/2004 |

(Continued)

OTHER PUBLICATIONS

Extended European Search Report received for corresponding European Patent Application No. 14189462.6, dated Mar. 25, 2015, 9 pages.

(Continued)

*Primary Examiner* — Jose Couso
(74) *Attorney, Agent, or Firm* — Alston & Bird LLP

(57) ABSTRACT

There is provided methods, apparatuses and computer program products for image segmentation in which pixel data of an image and information of a first set of pixels of the image indicative of pixels belonging to a foreground of the image are obtained. A color model of the image is estimated. To obtain a geodesic distance map at least one geodesic distance from a pixel of the first set of pixel to another pixel of the image which is not in the first set of pixels is determined. An energy function is optimized on the basis of the geodesic distance map to obtain a segmentation of the image.

20 Claims, 3 Drawing Sheets

(56) References Cited

U.S. PATENT DOCUMENTS

| | | | |
|---|---|---|---|
| 7,424,153 B2 | 9/2008 | Paragios et al. | |
| 7,706,610 B2 | 4/2010 | Zhang et al. | |
| 8,131,076 B2 | 3/2012 | Jolly et al. | |
| 8,218,870 B2 | 7/2012 | Tieu et al. | |
| 8,320,666 B2* | 11/2012 | Gong | G06T 7/0081 382/164 |
| 8,346,013 B2* | 1/2013 | Yamada | G06T 7/0081 345/629 |
| 8,351,654 B2* | 1/2013 | Criminisi | G06K 9/6215 382/109 |
| 8,391,594 B1* | 3/2013 | Wang | G06T 7/0083 382/100 |
| 8,437,570 B2 | 5/2013 | Criminisi et al. | |
| 8,478,072 B2* | 7/2013 | Aisaka | G06T 11/60 358/450 |
| 8,498,481 B2* | 7/2013 | Blake | G06T 7/0081 382/173 |
| 8,560,517 B2* | 10/2013 | Yang | G06F 17/30277 382/170 |
| 8,724,906 B2* | 5/2014 | Shotton | G06T 7/0046 382/209 |
| 9,189,886 B2* | 11/2015 | Black | G06T 7/0046 |
| 2011/0274352 A1 | 11/2011 | Blake et al. | |

FOREIGN PATENT DOCUMENTS

| | | |
|---|---|---|
| WO | 2012/108832 A1 | 8/2012 |
| WO | 2012/144957 A1 | 10/2012 |

OTHER PUBLICATIONS

Zhang et al., "Boundary Delineation in Prostate Imaging Using Active Contour Segmentation Method with Interactively Defined Object Regions", Prostate Cancer Imaging Computer-Aided Diagnosis, Prognosis, and Intervention Lecture Notes in Computer Science, vol. 6367, 2010, pp. 131-142.

Boykov et al., "Interactive Graph Cuts for Optimal Boundary & Region Segmentation of Objects in N-D Images", IEEE International Conference on Computer Vision, vol. 1, 2001, pp. 105-112.

Protiere et al., "Interactive Image Segmentation Via Adaptive Weighted Distances", IEEE Transactions on Image Processing, vol. 16, No. 4, Apr. 2007, pp. 1046-1057.

Bai et al., "A geodesic framework for fast interactive image and video segmentation and matting", 11th International Conference on Computer Vision, Oct. 14-21, 2007, pp. 1-8.

Criminisi et al., "GeoS: Geodesic Image Segmentation", Lecture Notes in Computer Science, 0th European Conference on Computer Vision, vol. 5302, 2008, pp. 99-112.

Price et al., "Geodesic Graph Cut for Interactive Image Segmentation", IEEE Conference on Computer Vision and Pattern Recognition, Jun. 13-18, 2010, pp. 3161-3168.

Gulshan et al., "Geodesic Star Convexity for Interactive Image Segmentation", IEEE Conference on Computer Vision and Pattern Recognition, Jun. 13-18, 2010, 8 pages.

Zhou et al., "Learning Geodesic CRF Model for Image Segmentation", IEEE International Conference on Image Processing, Sep. 30-Oct. 3, 2012, pp. 1565-1568.

Paragios et al., "A PDE-Based Level-Set Approach for Detection and Tracking of Moving Objects", Sixth International Conference on Computer Vision, Jan. 4-7, 1998, 7 Pages.

Chan et al., "Active Contours Without Edges", IEEE Transactions on Image Processing, vol. 10, No. 2, Feb. 2001, pp. 266-277.

Li et al., "Level Set Evolution without Re-Initialization: A New Variational Formulation", IEEE Computer Society Conference on Computer Vision and Pattern Recognition, vol. 1, Jun. 20-25, 2005, 7 Pages.

Paragios et al., "Coupled Geodesic Active Regions for Image Segmentation a Level Set Approach", 6th European Conference on Computer Vision, Lecture Notes in Computer Science, vol. 1843, Jun. 26-Jul. 1, 2000, 17 pages.

Li et al., "Distance Regularized Level Set Evolution and Its Application to Image Segmentation", IEEE Transactions on Image Processing, vol. 9, No. 12, Dec. 2010, pp. 3243-3254.

Office action received for corresponding Finnish Patent Application No. 20136040, dated Jun. 5, 2014, 7 pages.

Wang et al., "Touchcut: Single-Touch Object Segmentation Driven by Level Set Methods" IEEE International Conference on Acoustics, Speech and Signal Processing, Mar. 25-30, 2012, pp. 881-884.

Liu et al., "Interactive Image Segmentation Based on Level Sets of Probabilities", IEEE Transactions on Visualization and Computer Graphics, vol. 18, No. 2, Feb. 2012, pp. 202-213.

Bai et al., "Geodesic Matting: A framework for fast interactive image and video segmentation and matting", International Journal of Computer Vision, vol. 82, Issue 2, Apr. 2009, pp. 113-132.

Caselles et al., "Geodesic Active Contours", Fifth International Conference on Computer Vision, 1997, pp. 61-79.

* cited by examiner

APPARATUS, A METHOD AND A COMPUTER PROGRAM FOR IMAGE PROCESSING

TECHNICAL FIELD

The present invention relates to an apparatus, a method and a computer program for image processing, and more particularly to a process of image segmentation.

BACKGROUND INFORMATION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Visual content of an image or a video may be segmented into semantically meaningful regions, for example into foreground and background. While it has turned out to be difficult to implement fully automatic image segmentation, it has been proposed to utilize user interaction through capable devices in order to improve the overall performance.

Various technologies for interactive image segmentation are currently investigated and developed. In various applications a foreground object (or object of interest) may be extracted out of a possibly cluttered background in images with user-provided indications. The segmentation result may facilitate numerous applications, for instance compositing a new background, creating bokeh on the background, removing an object which is not desired to exist in the image, and stylizing background or object etc.

Some types of user interactions used for interactive image segmentation are drawing scribbles on foreground objects, possibly also on background objects, and possibly drawing a rectangle or an approximate contour around object of interest. Then, the segmentation process, such as a graph cut, may be started.

SUMMARY

This invention is related to an apparatus, a method and a computer program for image processing, and more particularly to a process of image segmentation. In some embodiments geodesic distance in level set framework is incorporated to address possible difficulties in the interactive image segmentation. In some embodiments, rather than simply using a geodesic distance map, an energy minimization approach may be used, i.e. a level set, aiming to achieve an optimal partition (or segmentation) of the image plane. On the other hand, in addition to colour or edge information, some embodiments enhance level set image segmentation with spatial locality information in geodesic distance, which may reduce a probability to select disjoint regions.

Various aspects of the invention include methods, apparatuses, computer programs, an encoder and decoder, which are characterized by what is stated in the independent claims. Various embodiments of the invention are disclosed in the dependent claims.

According to a first aspect, there is provided a method comprising:
obtaining pixel data of an image;
obtaining information of a first set of pixels of the image indicative of pixels belonging to one of a foreground of the image and a background of the image;
estimating a colour model of the image;
determining at least one geodesic distance from a pixel of the first set of pixel to another pixel of the image which is not in the first set of pixels to obtain a geodesic distance map; and
optimizing an energy function on the basis of the geodesic distance map to obtain a segmentation of the image.

According to a second aspect, there is provided an apparatus comprising at least one processor and at least one memory including computer program code, the at least one memory and the computer program code configured to, with the at least one processor, cause the apparatus to perform at least the following:
obtain pixel data of an image;
obtain information of a first set of pixels of the image indicative of pixels belonging to one of a foreground of the image and a background of the image;
estimate a colour model of the image;
determining at least one geodesic distance from a pixel of the first set of pixel to another pixel of the image which is not in the first set of pixels to obtain a geodesic distance map; and
optimize an energy function on the basis of the geodesic distance map to obtain a segmentation of the image.

According to a third aspect, there is provided a computer program product including one or more sequences of one or more instructions which, when executed by one or more processors, cause an apparatus to perform at least the following:
obtain pixel data of an image;
obtain information of a first set of pixels of the image indicative of pixels belonging to one of a foreground of the image and a background of the image;
estimate a colour model of the image;
determining at least one geodesic distance from a pixel of the first set of pixel to another pixel of the image which is not in the first set of pixels to obtain a geodesic distance map; and
optimize an energy function on the basis of the geodesic distance map to obtain a segmentation of the image.

According to a fourth aspect, there is provided an apparatus comprising:
means for obtaining pixel data of an image;
means for obtaining information of a first set of pixels of the image indicative of pixels belonging to one of a foreground of the image and a background of the image;
means for estimating a colour model of the image;
means for determining at least one geodesic distance from a pixel of the first set of pixel to another pixel of the image which is not in the first set of pixels to obtain a geodesic distance map; and
means for optimizing an energy function on the basis of the geodesic distance map to obtain a segmentation of the image.

According to a fifth aspect, there is provided an apparatus comprising means for performing the method according to any of claims 1 to 6.

BRIEF DESCRIPTION OF THE DRAWINGS

For better understanding of various embodiments, reference will now be made by way of example to the accompanying drawings in which:

FIG. 3b illustrates an example of relative geodesic distances from each pixel to foreground seeds in the example of FIG. 3a;

FIG. 3c illustrates an example of relative geodesic distances from each pixel to background seeds in the example of FIG. 3a;

FIG. 3d shows an example of a segmentation result from the example of FIG. 3a;

DETAILED DESCRIPTION

Figure 1A:
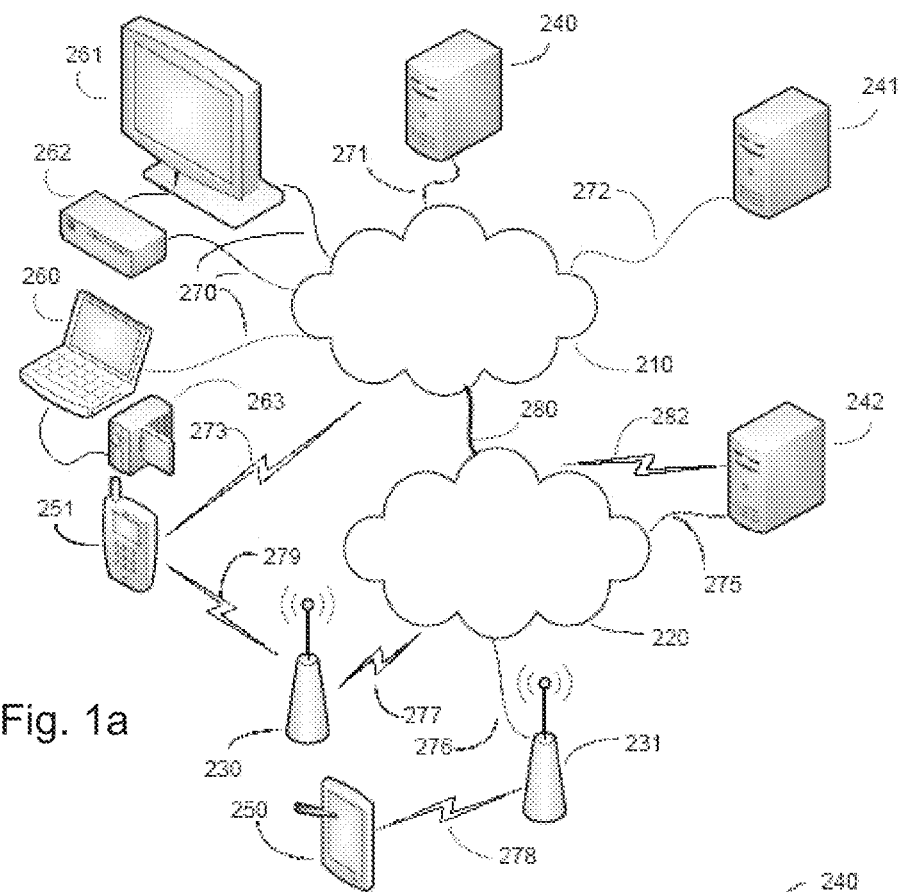
FIGS. 1a and 1b show a system and devices suitable to be used in image segmentation according to an embodiment.
Figure 1B:
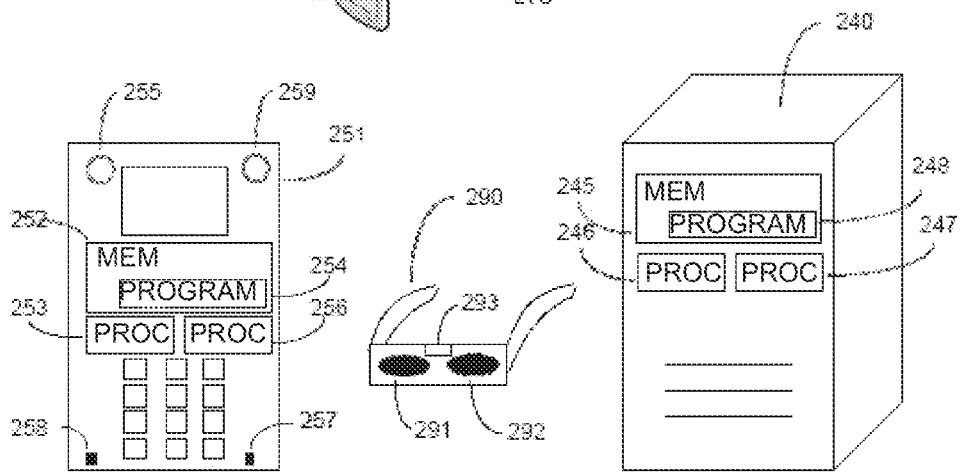

FIGS. 1a and 1b show a system and devices suitable to be used in an image segmentation according to an embodiment. In FIG. 1a, the different devices may be connected via a fixed network 210 such as the Internet or a local area network; or a mobile communication network 220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks may be connected to each other by means of a communication interface 280. The networks may comprise network elements such as routers and switches to handle data, and communication interfaces such as the base stations 230 and 231 in order for providing access for the different devices to the network, and the base stations 230, 231 are themselves connected to the mobile network 220 via a fixed connection 276 or a wireless connection 277.

There may be a number of servers connected to the network, and in the example of FIG. 1a are shown servers 240, 241 and 242, each connected to the mobile network 220. Some of the above devices, for example the computers 240, 241, 242 may be such that they are arranged to make up a connection to the Internet with the communication elements residing in the fixed network 210.

There may also be a number of end-user devices such as mobile phones and smart phones 251, Internet access devices, for example Internet tablet computers 250, personal computers 260 of various sizes and formats, televisions and other viewing devices 261, video decoders and players 262, as well as cameras 263 and other encoders. These devices 250, 251, 260, 261, 262 and 263 can also be made of multiple parts. The various devices may be connected to the networks 210 and 220 via communication connections such as a fixed connection 270, 271, 272 and 280 to the internet, a wireless connection 273 to the internet 210, a fixed connection 275 to the mobile network 220, and a wireless connection 278, 279 and 282 to the mobile network 220. The connections 271-282 are implemented by means of communication interfaces at the respective ends of the communication connection.

FIG. 1b shows devices for the image segmentation according to an example embodiment. As shown in FIG. 1b, the server 240 contains memory 245, one or more processors 246, 247, and computer program code 248 residing in the memory 245. The different servers 241, 242, 290 may contain at least these elements for employing functionality relevant to each server.

Similarly, the end-user device 251 contains memory 252, at least one processor 253 and 256, and computer program code 254 residing in the memory 252 for implementing, for example, the image segmentation process. The end-user device may also have one or more cameras 255 and 259 for capturing image data, for example stereo video. The end-user device may also contain one, two or more microphones 257 and 258 for capturing sound.

The end user devices may also comprise a screen for viewing single-view, stereoscopic (2-view), or multiview (more-than-2-view) images. The end-user devices may also be connected to video glasses 290 e.g. by means of a communication block 293 able to receive and/or transmit information. The glasses may contain separate eye elements 291 and 292 for the left and right eye. These eye elements may either show a picture for viewing, or they may comprise a shutter functionality e.g. to block every other picture in an alternating manner to provide the two views of three-dimensional picture to the eyes, or they may comprise an orthogonal polarization filter (compared to each other), which, when connected to similar polarization realized on the screen, provide the separate views to the eyes. Other arrangements for video glasses may also be used to provide stereoscopic viewing capability. Stereoscopic or multiview screens may also be autostereoscopic, i.e. the screen may comprise or may be overlaid by an optics arrangement, which results into a different view being perceived by each eye. Single-view, stereoscopic, and multiview screens may also be operationally connected to viewer tracking such a manner that the displayed views depend on viewer's position, distance, and/or direction of gaze relative to the screen.

In addition to applications relating to image editing such as compositing a new background, creating bokeh on the background, removing undesired object, and stylizing background or object in an image, different embodiments could be used in different applications, such as in converting 2D images to 3D images.

It needs to be understood that different embodiments allow different parts to be carried out in different elements. For example, various processes of image segmentation may be carried out in one or more processing devices; for example, entirely in one user device like 250, 251 or 260, or in one server device 240, 241, 242 or 290, or across multiple user devices 250, 251, 260 or across multiple network devices 240, 241, 242, 290, or across both user devices 250, 251, 260 and network devices 240, 241, 242, 290. The elements of the image segmentation process may be implemented as a software component residing on one device or distributed across several devices, as mentioned above, for example so that the devices form a so-called cloud.

An embodiment relates to a method for interactive, dynamic and real-time image segmentation usable in data processing devices, especially in touch screen devices, which method enables to effectively select a foreground object or objects from background. In an example method, a user of the touch screen device may be prompted to select the foreground object by providing one or more scribbles on the desired object through the touch screen. Some embodiments of the method are based on an algorithm, which uses pixel data located in the neighbourhood of the input scribble and the rest of the image, and performs a segmentation to separate the foreground object from background. The algorithm iteratively updates the model parameters used in segmentation during new stroke information provided by the user and updates the segmented object on the screen. The segmentation method may utilize iterative and dynamic usage of geodesic distance in a level set framework.

Figure 2:
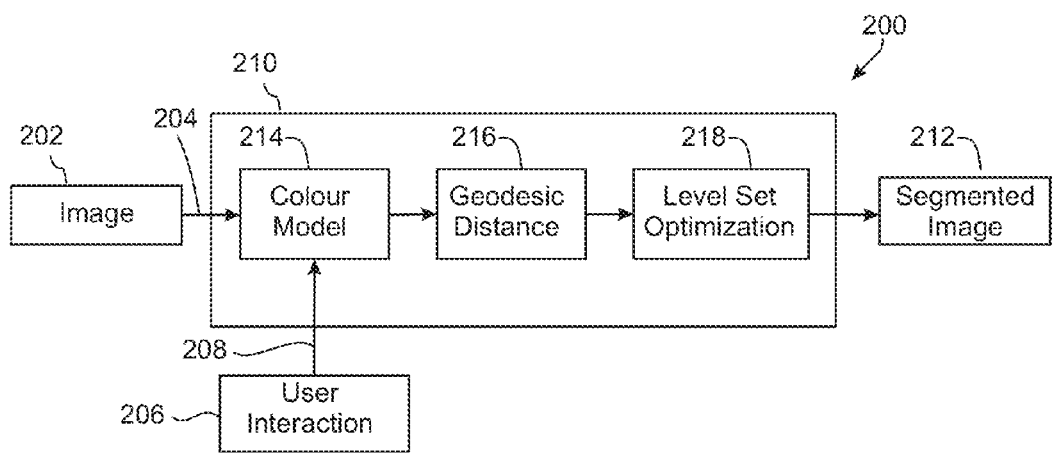
FIG. 2 shows a simplified block diagram of an apparatus 200 according to an embodiment.

A simplified block diagram of an apparatus 200 according to an embodiment is illustrated in FIG. 2. An image 202 may be received 204 from the camera 255, 259, from the memory 252, from the server 240, 241, 242, 290 or from another source. Information 206 regarding foreground portion and background portion may also be received 208 e.g. as one or more scribbles provided by a user. This information may contain indication on a first set of pixels which may represent the foreground portion and a second set of pixels which may represent the background portion, or vice versa. The apparatus 200 comprises an image segmenting element 210 to obtain a segmented image 212. The image segmenting element 210 may comprise a colour model determining element 214 in which colour models for both foreground and background may be estimated. Estimated colour models may be provided to a geodetic distance computing element 216 to obtain geodesic distances. The geodesic distances may be used by a level set optimization element 218 to form the segmented image 212.

In the following, the operations of the elements of the example apparatus 200 are described in more detail with reference to FIG. 2 and FIGS. 3a to 3d.

The information 206 regarding foreground portion and background portion may be provided e.g. by the user drawing lines on a touch screen by a finger, a pen, or another object which may be used as a stylus i.e. which is recognizable by the touch screen. Locations touched by the stylus on the touch screen are used to determine the location and the shape of the scribbles. When the user lifts the stylus from the surface of the touch screen, it may be determined to mean the end point of one scribble. The colour of the pixels which are located at the touched locations may be changed to indicate the location of the scribble. In other words, the user interaction may be indicated on the display by changing the colour of the interaction point. In some embodiments the colour of scribbles indicating foreground objects may be different from the colour of scribbles indicating background objects. The user may provide one or more scribbles for foreground and one or more scribbles for background. The pixels which belong to scribbles indicative of foreground may be called as a first set of pixels and, respectively, the pixels which belong to scribbles indicative of background may be called as a second set of pixels.

Figure 3A:
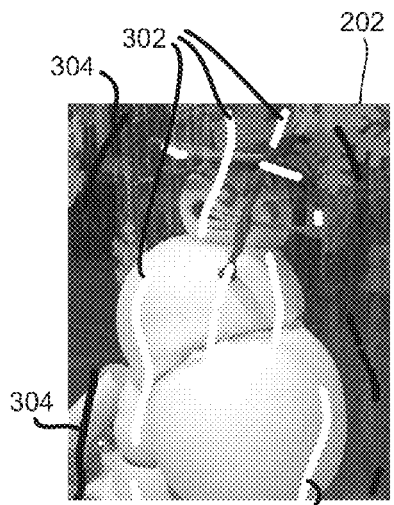
FIG. 3a illustrates some examples of user drawn scribbles on an image.

FIG. 3a illustrates some examples of user drawn scribbles on an image 202. White lines 302 indicate scribbles provided for foreground object(s) and black lines 304 indicate scribbles provided for background.

Instead of the stylus the user may use another kind of pointing means such as a mouse to indicate the location of the scribble(s) on the display area e.g. if a conventional display without a touch input feature is used.

The segmentation process may be started e.g. when the user has indicated that all scribbles have been defined or when the number of interaction points exceeds a value of a predetermined threshold. The value of the predefined threshold may vary depending on the properties of the device or the image to be segmented, for example. Generally, a value between 5 and 20 pixels, such as 10 pixels, can be used as the value of the predefined threshold, but naturally values beyond this range are applicable, as well.

The image and information on the scribbles may be provided to the colour model determining element 214 of the image segmenting element 210. The colour model determining element 214 may estimate colour models for both foreground (F) and background (B), based on the seeds (e.g. the scribbles) provided by the user. In some embodiments, the foreground and background colour model may be represented by Gaussian Mixture Model (GMM) learned from observations of pixels. Each pixel (with colour c) may be assigned with likelihoods $P(c|l)$ with $l \in \{F,B\}$. In other words, it is estimated that what is the probability $P(c|F)$ that a pixel c of the image belongs to the foreground and what is the probability $P(c|B)$ that the pixel c of the image belongs to the background. The estimation results to two sets of probabilities.

The image segmenting element 210 may also determine geodetic distances from the seeds to the rest of pixels by the geodetic distance computing element 216. The geodesic distance $d(x)$ is the smallest integral of a weight function over all paths from the seeds to a pixel at location x. Let $\Omega_F$ be the set of foreground pixel seeds (the first set of pixels) and $\Omega_B$ be the set of background pixel seeds (the second set of pixels). The weighted distance from each of these two sets of seeds for every pixel x may then be computed as:

$$D_l(x) = \min_{s \in \Omega_l} d(s,x), l \in \{F,B\} \tag{1}$$

where $$d(s_1, s_2) := \min_{C_{s_1,s_2}} \int_0^1 |W \cdot \dot{C}_{s_1,s_2}(p)| dp$$

where $C_{s_1,s_2}$ represents a path connecting the pixels $s_1$ and $s_2$ for p=0 and p=1, respectively. The weight W may be defined as $\nabla P_F(c)$, $\nabla P_B(c)$, where $P_F(c)$ is the probability that a pixel with colour c belongs to the foreground, and $P_B(c)$ is the probability that a pixel with colour c belongs to the background.

The probabilities may be defined as follows:

$$P_l(c) = \frac{P(c|l)}{P(c|F) + P(c|B)}, \tag{2}$$

where $l \in \{F,B\}$.

$P(c|l)$ is the likelihood of observing colour c given the colour model of l ($l \in \{F,B\}$) determined by the colour model determining element 214. By computing per-pixel geodesic distances $D_l(x)$, the relative geodesic distance map to F or B may be computed as $$G_l(x) = \frac{D_l(x)}{D_F(x) + D_B(x)} \tag{3}$$

Figure 3B:
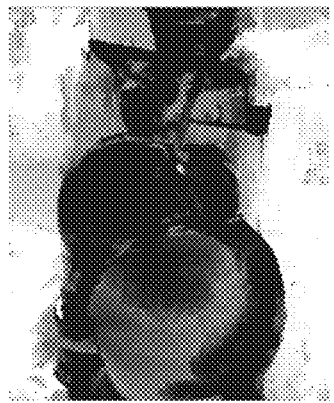
Figure 3C:
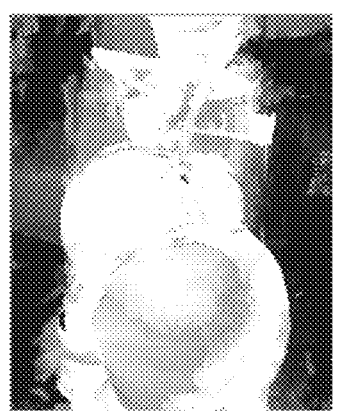

FIG. 3b illustrates an example of relative geodesic distances from each pixel to foreground seeds. The lighter is the colour of the pixel in the image of FIG. 3b the smaller is the geodesic distance from the pixel to the foreground object. Respectively, FIG. 3c illustrates an example of relative geodesic distances from each pixel to background seeds. The lighter is the colour of the pixel in the image of FIG. 3b the smaller is the geodesic distance from the pixel to the background.

The level set optimization element 218 may then generate an optimal partition or segmentation of the image plane by optimizing an energy function based on the relative geodesic distance map $D_l(x)$ generated by the geodetic distance computing element 216. In some embodiments an optimal two-region partition of the image plane may be achieved by minimizing the summation of the total relative geodesic distance to the foreground seeds of pixels in the region inside a contour and the total relative geodesic distance to the background seeds of pixels in the region outside the contour, which may be formulated as $$E_g = \int_\Omega H(\phi)G_F(x)+(1-H(\phi))G_B(x)dx \quad (4)$$

where $H(\phi)$ is the Heaviside function and $\phi$ is the level set embedding function.

Using the standard gradient descent method, this energy function can be optimized in a level set framework e.g. by minimizing $$\frac{\partial \phi}{\partial t} = -\frac{\partial E_g}{\partial \phi}. \quad (5)$$

The gradient flow can be deducted as $$\frac{\partial E_g}{\partial \phi} = \delta(\phi)(G_F(x) - G_B(x)), \quad (6)$$

where $\delta(\phi)$ is the Dirac delta function.

Figure 3D:

The embedding function $\phi$ may be initialized by extracting the contour of the foreground seeds. The final segmentation is the region inside the zero-level contour by optimizing the energy function after a predefined number of iterations. In some embodiments the number of iterations may be different in different situations. FIG. 3d illustrates an example of the final segmentation result i.e. the segmented image 212.

From the usability point of view, it may be beneficial that the user may stop drawing the scribbles on the foreground object at any point, but the algorithm may automatically continue the segmentation on the basis of the user interaction provided so far. This derives from the fact that only a minimum amount of user interaction may be needed to start the segmentation. Thus, when the user feels that he/she has provided enough interaction for the completion of providing seeds, he/she can simply stop providing user commands, for example by removing the finger from touch screen, which may be detected by the apparatus 200. In response to the user stopping to provide user commands, the algorithm proceeds to complete the on-going iteration step, where after the result of the segmentation as carried out so far may be shown on the display. If the user is not satisfied with the resulting segmentation, he/she may continue the interaction by providing further user commands, for example by touching again on the screen.

Figure 4:
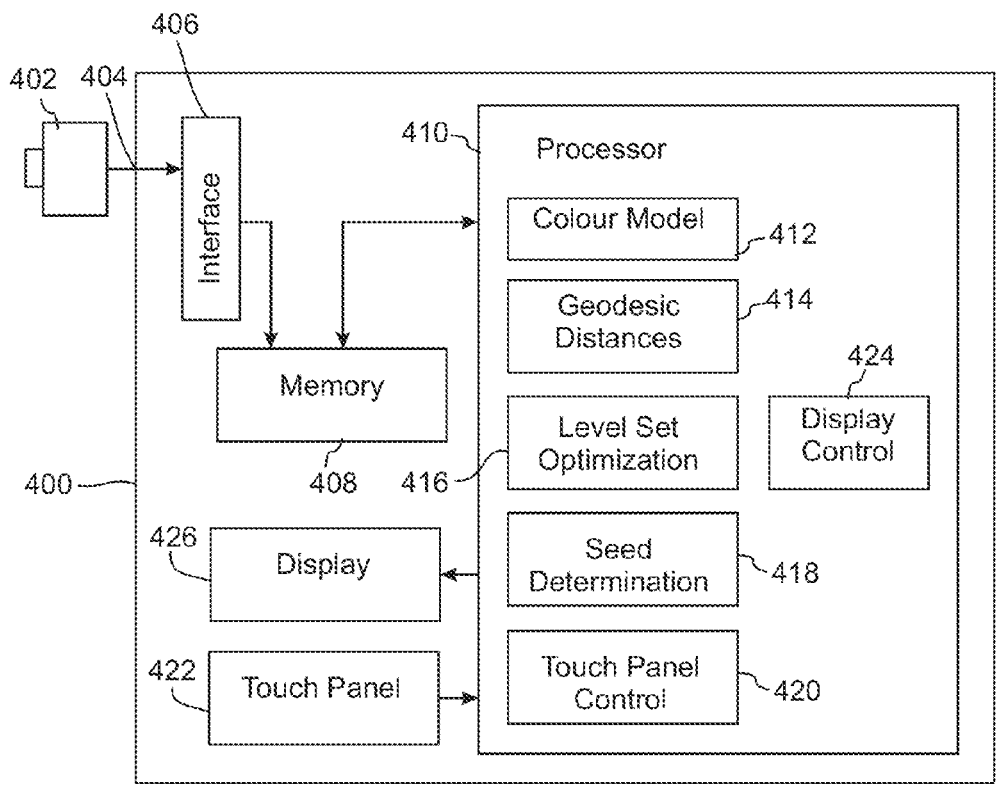
FIG. 4 shows another example of a device suitable to be used in image segmentation according to an embodiment.

FIG. 4 illustrates another example of a device 400 in which the present invention may be applied. The device may receive 404 images from the camera 402. The image information may be provided via an interface 406 to the memory 408 of the device 400, for example. The device 400 may also comprise one or more processors 410 for controlling operations of the device etc. The processor 410 may be enabled to execute software instructions for performing inter alia the image segmentation operations described above. Hence, there may be software instructions 412 for determining the colour model, software instructions 414 for determining the geodesic distances, software instructions 416 for level set optimization, and software instructions 418 for determining seeds on the basis of user input. The processor 410 may further be enabled to execute software instructions 420 for controlling the touch panel 422 and software instructions 424 for displaying information on the display 426. The software instructions may have been stored into the memory 408 of the device 400 from where the processor 410 may fetch the instructions for running the software.

Figure 5:
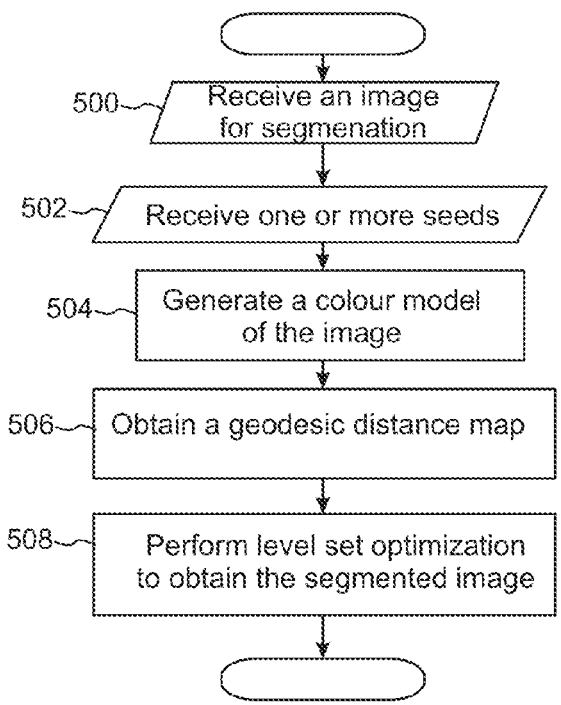
FIG. 5 shows a method according to an example embodiment as a flow diagram.

FIG. 5 shows a simplified flow diagram of a method for image segmentation according to an example embodiment. The image is received at block 500. User defined seeds are received in block 502. A colour model of the image is generated at block 504 on the basis of the seeds. The image and the colour model are provided at block 506 for the determination of the geodesic distance map $D_f(x)$. The geodesic distance map $D_f(x)$ is used by the level set optimization block 508 to obtain the segmented image.

Even though many of the implementation details described above are selected due to their performance efficiency, it is noted that a plurality of alternatives are available for various implementation details. For example, instead of using a colour GMM based background and foreground model, a spatio-colour model can be used. Instead of the GMM, a colour histogram or an intensity histogram can be used in modelling the foreground and the background.

Similarly, instead of using the likelihood of foreground and background GMM for finding edge costs of the graph, some other method can also be used, like determining the distance to a mean colour. Regarding the segmentation, a method based on alpha/beta swapping may also be used to segment the image into background and foreground. Any other energy minimization, such as simulated annealing or belief propagation, may also be used to minimize the defined cost function.

According to an embodiment, the user interaction with the image on the display may be arranged to simulate a colouring gesture to make interaction entertaining and intuitive. Initially, a grayscale version of the image is provided on the display and the user start to colour an object of interest within the image. The result of the segmentation is shown to user by colouring the foreground object; i.e. the pixels belonging to foreground object is shown in colour, whereas background pixels are shown in grayscale. Using this feedback from the device, the user may continue to draw scribbles and colour the remaining areas of the foreground object.

If a touch-screen device is used in the method, it may become cumbersome to select foreground and background regions separately because of the limitations of the touch-screen device, such as the lack of right-button mouse click. According to an embodiment, only foreground is selected by the user, whereas the background model may be estimated indirectly from the foreground model e.g. as the model of the regions which are farthest from foreground model. According to another embodiment, only background is selected by the user, whereas the foreground model may be estimated indirectly from the background model e.g. as the model of the regions which are farthest from background model.

The above method is applicable to interactive video segmentation, as well. Therein, the interaction of the user in the first frame may be utilised in the video segmentation such that the interaction is propagated through the subsequent frames. Accordingly, the user interaction is started by drawing scribbles on a foreground object in the first frame. The user interaction is continued in the first frame, whereafter the algorithm as described above solves the minimization problem and shows the segmented boundary on the screen.

A skilled man appreciates that any of the embodiments described above may be implemented as a combination with one or more of the other embodiments, unless there is explicitly or implicitly stated that certain embodiments are only alternatives to each other.

The various embodiments may provide advantages over state of the art. With rather minimum amount of user interaction, an accurate and pleasant looking segmentation and 3D perception may be achieved.

The various embodiments provide real-time image segmentation, which is remarkably robust to interaction errors. From the usability point of view, the overall process is intuitive and entertaining for the user. Furthermore, the process is adaptive to complicated textures of foreground objects.

Thus, user equipment may comprise means for image processing such as those described in embodiments of the invention above. It shall be appreciated that the term user equipment is intended to cover any suitable type of user equipment, such as mobile telephones, portable data processing devices or portable web browsers or other computing devices, TVs, monitors for computers, cameras, electronic games, etc.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
    obtaining pixel data of an image;
    obtaining information of a first set of pixels of the image indicative of pixels belonging to one of a foreground of the image and a background of the image;
    estimating a colour model of the image;
    estimating a probability that a pixel of the first set of pixels belongs to one of a foreground of the image and a background of the image based on the colour model;
    obtaining a geodesic distance map based on determining at least one geodesic distance from the pixel of the first set of pixels to another pixel of the image which is not in the first set of pixels and the estimated probability; and
    optimizing an energy function on the basis of the geodesic distance map to obtain a segmentation of the image.

2. The method according to claim 1 further comprising obtaining information of a second set of pixels of the image indicative of pixels belonging to the other one of the background of the image and the foreground of the image.

3. The method according to claim 1, wherein the determining at least one geodesic distance comprises obtaining a smallest integral of a weight function over all paths from the pixels of the first set of pixels to the another pixel.

4. The method according to claim 3 further comprising obtaining the geodesic distance map as $$G_l(x) = \frac{D_l(x)}{D_F(x) + D_B(x)},$$

where $$D_l(x) = \min_{s \in \Omega_l} d(s, x), l \in \{F, B\},$$

$$d(s_1, s_2) := \min_{C_{s_1,s_2}} \int_0^1 |W \cdot \dot{C}_{s_1,s_2}(p)| dp,$$

$$W = \nabla P_l(c),$$

$$P_l(c) = \frac{P(c \mid l)}{P(c \mid F) + P(c \mid B)}, l \in \{F, B\}.$$

5. The method according to claim 1, wherein the optimization comprising minimizing a summation of the total relative geodesic distance to the first set of pixels in the region inside a contour and the total relative geodesic distance to the second set of pixels in the region outside the contour.

6. The method according to claim 1 further comprising repeating the optimization of the energy function.

7. An apparatus comprising at least one processor and at least one memory including computer program code, the at least one memory and the computer program code configured to, with the at least one processor, cause the apparatus to perform at least the following:
obtain pixel data of an image;
obtain information of a first set of pixels of the image indicative of pixels belonging to one of a foreground of the image and a background of the image;
estimate a colour model of the image;
estimate a probability that a pixel of the first set of pixels belongs to one of a foreground of the image and a background of the image based on the colour model;
obtain a geodesic distance map based on determining at least one geodesic distance from the pixel of the first set of pixels to another pixel of the image which is not in the first set of pixels and the estimated probability; and
optimize an energy function on the basis of the geodesic distance map to obtain a segmentation of the image.

8. The apparatus according to claim 7, said at least one memory including computer program code, which with the at least one processor, cause the apparatus to obtain information of a second set of pixels of the image indicative of pixels belonging to the other one of the background of the image and the foreground of the image.

9. The apparatus according to claim 7, wherein said at least one memory including computer program code, which with the at least one processor, cause the apparatus to determine the at least one geodesic distance by obtaining a smallest integral of a weight function over all paths from the pixels of the first set of pixels to the another pixel.

10. The apparatus according to claim 9, wherein said at least one memory including computer program code, which with the at least one processor, cause the apparatus to obtain the geodesic distance map as $$G_l(x) = \frac{D_l(x)}{D_F(x) + D_B(x)},$$

where $$D_l(x) = \min_{s \in \Omega_l} d(s, x), l \in \{F, B\},$$

$$d(s_1, s_2) := \min_{C_{s_1, s_2}} \int_0^1 |W \cdot \dot{C}_{s_1, s_2}(p)| dp,$$

$$W = \nabla P_l(c),$$

$$P_l(c) = \frac{P(c \mid l)}{P(c \mid F) + P(c \mid B)}, l \in \{F, B\}.$$

11. The apparatus according to claim 7, wherein said at least one memory including computer program code, which with the at least one processor, further cause the apparatus to perform the optimization by minimizing a summation of the total relative geodesic distance to the first set of pixels in the region inside a contour and the total relative geodesic distance to the second set of pixels in the region outside the contour.

12. The apparatus according to claim 7, wherein said at least one memory including computer program code, which with the at least one processor, cause the apparatus to repeat the optimization of the energy function.

13. The apparatus according to claim 7, wherein the apparatus is an element of a mobile phone.

14. The apparatus according to claim 7, wherein the apparatus is an element of a computing device.

15. A computer program product including one or more sequences of one or more instructions which, when executed by one or more processors, cause an apparatus to perform at least the following:
obtain pixel data of an image;
obtain information of a first set of pixels of the image indicative of pixels belonging to one of a foreground of the image and a background of the image;
estimate a colour model of the image;
estimate a probability that a pixel of the first set of pixels belongs to one of a foreground of the image and a background of the image based on the colour model;
obtain a geodesic distance map based on determining at least one geodesic distance from the pixel of the first set of pixels to another pixel of the image which is not in the first set of pixels and the estimated probability; and
optimize an energy function on the basis of the geodesic distance map to obtain a segmentation of the image.

16. The computer program product according to claim 15, wherein said at least one memory including computer program code, which with the at least one processor, cause the apparatus to obtain information of a second set of pixels of the image indicative of pixels belonging to the other one of the background of the image and the foreground of the image.

17. The computer program product according to claim 15, wherein said at least one memory including computer program code, which with the at least one processor, cause the apparatus to determine the at least one geodesic distance by obtaining a smallest integral of a weight function over all paths from the pixels of the first set of pixels to the another pixel.

18. The computer program product according to claim 17, wherein said at least one memory including computer program code, which with the at least one processor, further cause the apparatus to obtain the geodesic distance map as $$G_l(x) = \frac{D_l(x)}{D_F(x) + D_B(x)},$$

where $$D_l(x) = \min_{s \in \Omega_l} d(s, x), l \in \{F, B\},$$

$$d(s_1, s_2) := \min_{C_{s_1, s_2}} \int_0^1 |W \cdot \dot{C}_{s_1, s_2}(p)| dp,$$

$$W = \nabla P_l(c),$$

$$P_l(c) = \frac{P(c \mid l)}{P(c \mid F) + P(c \mid B)}, l \in \{F, B\}.$$

19. The computer program product according to claim 15, wherein said at least one memory including computer program code, which with the at least one processor, cause the apparatus to perform the optimization by minimizing a summation of the total relative geodesic distance to the first set of pixels in the region inside a contour and the total relative geodesic distance to the second set of pixels in the region outside the contour.

20. The computer program product according to claim 15, wherein said at least one memory including computer program code, which with the at least one processor, cause the apparatus to repeat the optimization of the energy function.

* * * * *